Nov. 24, 1936. P. L. TYSON 2,061,816

PROCESS OF MAKING TIN TETRACHLORIDE

Filed May 14, 1932

INVENTOR
Paul L. Tyson
BY
ATTORNEY

Patented Nov. 24, 1936

2,061,816

UNITED STATES PATENT OFFICE 2,061,816

PROCESS OF MAKING TIN TETRACHLORIDE

Paul L. Tyson, New York, N. Y., assignor to General Chemical Company, New York, N. Y., a corporation of New York Application May 14, 1932, Serial No. 611,287

15 Claims. (Cl. 23—98)

This invention relates to methods and apparatus for combining solids and gases, and is more particularly directed to the manufacture of anhydrous tin tetrachloride by the reaction of tin and chlorine.

Several processes for effecting the combination of tin and chlorine with the resulting formation of tin tetrachloride have been suggested. One of the principal objects of the present invention lies in the provision of a method for making tin tetrachloride by which tin may be charged to the process in the form of blocks or pigs, or other easily procurable and conveniently handled condition. Further, the invention aims to provide a method for producing tin tetrachloride in accordance with which a relatively small portion of the block tin is reacted with chlorine to form tin tetrachloride, the process being so conducted that the heat evolved is efficiently utilized to melt down the large blocks of tin and convert the tin into a finely divided condition, the major portion of the reaction being with this finely divided tin. Another object of the invention resides in the provision of a mode of operation by which the temperature of the reaction as a whole may be advantageously controlled, and by which the manufacture of tin tetrachloride may be economically effected on a continuous, commercial scale.

One phase of the process of the invention comprises the introduction of tin in finely divided form into a bath of liquid tin tetrachloride, and effecting reaction of the tin in the bath with chlorine to form liquid tin tetrachloride. In a preferred specific embodiment, the invention involves what may conveniently be considered a two-stage operation for manufacturing tin tetrachloride. Tin, in block or pig form, is charged into a reaction zone, and chlorine is admitted thereto in amounts so limited as to prevent the temperature in the reaction zone rising substantially above the melting point of tin. A minor portion of the tin tetrachloride product of the process is formed in the vapor state, and the heat generated by the reaction produces local overheating sufficient to gradually melt the major portion of the block tin. The vaporous tin tetrachloride formed may be removed from the reaction zone as such and condensed, or, in accordance with the preferred mode of operation, is condensed and runs into a bath of liquid tin tetrachloride maintained in the second stage of the process and constituting a second reaction zone. The tin melted in the first reaction zone is continuously fed into the bath of liquid tin tetrachloride and, because of the temperature of the liquid, is converted into a finely divided state, such as shot or feathered tin. Chlorine is then introduced into the bath in quantities about sufficient to react with the shot tin in the bath, and the production of tin tetrachloride in liquid form proceeds in a continuous manner.

A further understanding and appreciation of the objects and advantages of the invention may be had from a consideration of the following description taken in connection with the accompanying drawing in which—

Figure 1:
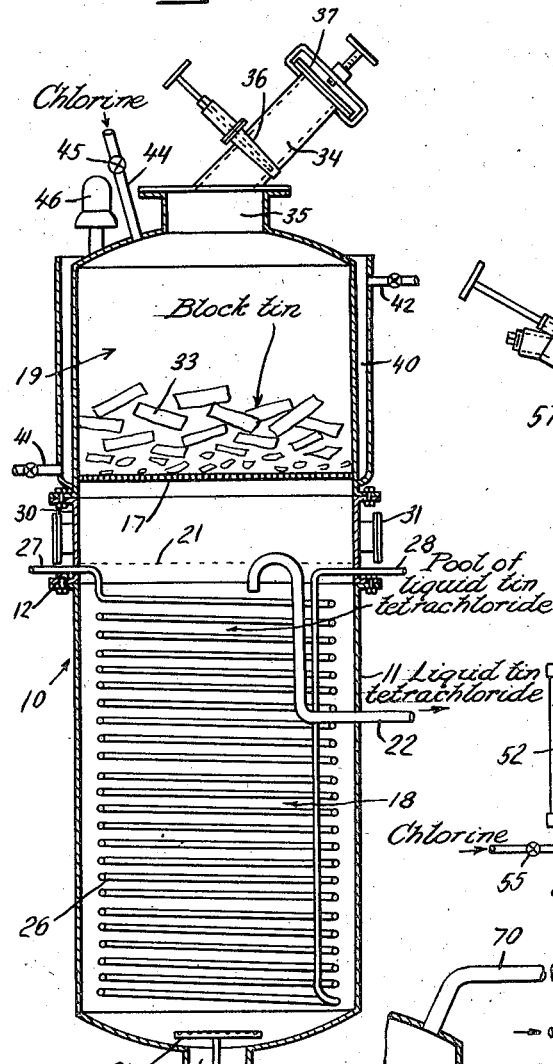
Fig. 1 is a vertical section of a preferred construction of a chlorinating apparatus.

Referring to Fig. 1, the reference numeral 10 indicates a chlorinator comprising a vertical, preferably cylindrical steel shell 11, which may be conveniently made in sections joined together by flanged connections 12. The lower end of the shell is provided with a clean-out opening 13, normally closed by a cover 14. Inside the chlorinator is a horizontally disposed steel grille 17 positioned somewhat above the mid-section of the shell 11. In effect, the grille 17 separates the chlorinator into lower and upper reaction zones indicated respectively by the reference numerals 18 and 19.

In the preferred embodiment of the invention, the greater portion of the reaction between tin and chlorine takes place in the lower reaction zone 18 wherein is a pool or bath of liquid tin tetrachloride, the surface of which is indicated by dotted line 21. The normal level of the bath may be maintained by an outlet connection 22, through which the product of the reaction may be continuously withdrawn in liquid form. Chlorine gas is introduced into the pool of tin tetrachloride through a perforated pipe 24 connected to a chlorine inlet pipe 25 passing through the cover 14. A cooling coil 26, having a liquid inlet 27 and an outlet 28, is immersed in the pool of tin tetrachloride, and provides convenient means for maintaining the temperature of the bath below the boiling point.

The center section 30 of shell 11 is provided with one or more sight openings 31, to facilitate observation of the course of the reaction in the chlorinator. The grille 17 is adapted to support a charge of block or pig tin, indicated by reference numeral 33, which may be fed into the chlorinator through a hopper 34, communicating with the inlet opening 35 in the upper end of the shell 11. The hopper may include a pair of gates or valves 36 and 37, or be of any suitable construction, by which block tin may be charged as required into the chlorinator without permitting the escape of gases therefrom.

Regulation of the temperature in the upper reaction zone 19 is partly effected by cooling liquid in a jacket 40, surrounding the upper end of the shell, the quantity of liquid circulated through the jacket being controlled by a valve in inlet connection 41. Chlorine gas may be introduced into the upper reaction zone through an inlet pipe 44, having a control valve 45. A safety valve 46 on the upper end of the shell is adjusted to prevent excessive pressures in the chlorinator.

Figure 2:
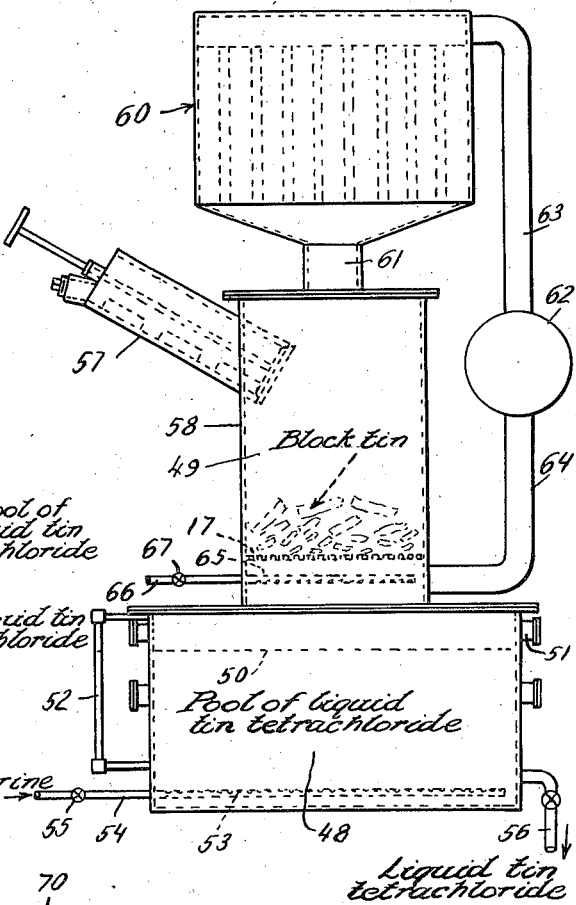
Fig. 2 is a diagrammatic elevation of a modified form.

In the modified form of apparatus shown in Fig. 2, the construction is also such as to provide communicating lower and upper reaction zones 48 and 49. The surface of the bath of liquid tin tetrachloride in the lower reaction zone 48 is maintained approximately at the dotted line 50. The sight openings 51 near the upper end of the lower section of the shell are positioned above the surface of the bath, the level of which may be determined by gauge 52. Chlorine is introduced into the lower reaction zone 48 through a perforated pipe 53 connected with chlorine inlet pipe 54 controlled by valve 55, and the product of the reaction is withdrawn as liquid from the chlorinator through a valved outlet pipe 56. One end of a hopper 57 projects through the upper section 58 of the chlorinator and opens into the upper reaction zone 49, the construction of the hopper being similar to that of Fig. 1, to facilitate charging of block tin into the chlorinator without allowing gases to escape into the atmosphere. The block tin in the upper reaction zone rests on grille 17 spaced upwardly from the lower end of the shell section 58.

Mounted on the upper end of the chlorinator is a reflux condenser, indicated generally by the reference numeral 60, communicating with the upper reaction zone through a conduit 61. The condenser may be of any approved type, designed to effect therein condensation of vaporous tin tetrachloride and the return of the liquid to the chlorinator. Uncondensed gases are withdrawn from the upper end of the condenser by a blower 62 through pipe connection 63, and are charged back into the upper reaction zone through pipe 64 opening into the chlorinator at a point just below the grille 17. In the process carried out in this form of apparatus, chlorine gas is introduced into the upper reaction zone 49 through a pipe 65, perforated on the under side and connected to an inlet pipe 66, controlled by valve 67.

Figure 3:
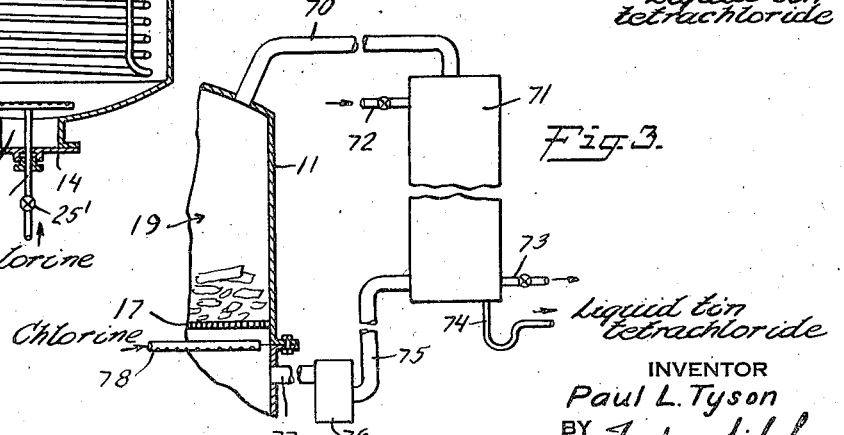
Fig. 3 is a modification of the chlorinator shown in Fig. 1.

Fig. 3 illustrates, partly in section and partly in elevation, a modification of the apparatus of Fig. 1. In the chlorinator of Fig. 3, the temperature in the reaction zone 19 may be partly or preferably wholly controlled by circulating inert gases through the upper end of the shell. For this purpose, gases and vapors are withdrawn from the reaction zone 19 through a pipe 70 and are conducted into a condenser 71 through which water is circulated in heat exchange relation with the chlorinator gas stream, the quantity of water passing through the condenser being controlled by adjustment of the valves in inlet and outlet pipes 72 and 73. Tin tetrachloride, condensed out of the chlorinator gases is withdrawn from the condenser through a liquid seal 74, and constitutes one portion of the product of the process.

Uncondensed gases and vapors are withdrawn by exhauster 76 from the lower end of the condenser 71 through pipe 75, and are fed back into the upper reaction zone 19 through pipe 77 opening into the chlorinator just below the grille 17. The circulation of inert gases, as described, usually adequately provides for maintenance of proper temperatures in the upper end of the chlorinator. In the apparatus of Fig. 3, as in that of Fig. 2, chlorine is also introduced into the upper reaction zone through a perforated pipe 78, positioned beneath the grille 17, and suitably connected to a source of supply.

One preferred embodiment of the process of the invention may be carried out in apparatus of Fig. 1 substantially as follows. At the beginning of the operation, the lower reaction zone 18 is filled with liquid tin tetrachloride until the surface thereof reaches approximately line 21, and a suitable quantity of block tin is charged into the upper end of the chlorinator through the hopper 34. For the purpose of initiating the reaction between the tin and chlorine, a relatively large quantity of substantially dry chlorine is introduced into the upper zone 19 through the inlet 44 to contact with the block tin on the grille 17, all or part of the air initially in the chlorinator being vented through valve 46, if so desired. As is known, chlorine and tin combine exothermically to form tin tetrachloride, the product being in the form of liquid or vapor in accordance with the temperature conditions prevailing during the operation.

When reaction between the block tin and chlorine starts, on account of the initially low temperature, the greater portion of the tin tetrachloride product is probably liquid, and as such drops through the grille 17 into the pool of liquid tin tetrachloride in the lower zone 18. As the combination of tin and chlorine proceeds in the upper reaction zone 19, the temperature therein rapidly rises, and is soon high enough to bring about local overheating in different parts of the charge of block tin, and consequently cause melting of portions of the tin. With the increase in temperature, most of the tin tetrachloride formed is probably in the vapor state, and, on coming in contact with the water-cooled walls of the upper end of the shell, condenses and eventually flows down along the interior walls of the chamber and into the pool of liquid tin tetrachloride in the lower end of the chlorinator. As soon as the temperature in the reaction zone 19 increases to such degree as to cause local overheating and gradual melting of portions of the tin, the supply of chlorine through the inlet pipe 44 is diminished so that, thereafter, only enough chlorine is admitted into the reaction zone 19 to permit that amount of reaction to take place between the chlorine and tin which will generate heat sufficient to substantially continuously melt relatively small portions of tin which run through grille 17 and drop in the pool in the bottom of the vessel.

It is to be understood, in connection with the preferred mode of operation, that the principal purpose of reacting tin and chlorine in the upper zone 19 is to effect melting of the tin, to permit feeding tin in this condition to the pool in the bottom of the chlorinator, rather than to form any predominating proportion of the product of the process by the combination of block tin and chlorine. In the course of the reaction taking place above the grille 17, the temperature may vary over a considerable range, but preferably should not be permitted to rise very much above the melting point of tin. In the preferred mode of operation, the temperature of the reaction gases in the upper end of the chlorinator may be considerably less than the melting point of tin, and generally not in excess of about, say, 270–300° F., local overheating being sufficient to melt the desired quantity of tin. The rate of melting of the tin may be observed through the sight openings 31, and the desired rate of melting and supply of molten tin to the tin tetrachloride bath may be secured by adjustment of valve 45 in the chlorine inlet 44, and further by controlling the rate of circulation of cooling liquid through the jacket 40. Once the desired conditions are obtained, the melting operation with the coincident production of a relatively small proportion of tin tetrachloride proceeds without interruption.

The molten tin, dropping through the grille 17 and into the pool of liquid tin tetrachloride in the lower reaction zone 18, solidifies on dropping into the liquid, and forms finely divided shot or feathered tin which sinks to the bottom of the bath. As soon as the reaction in the upper end of the chlorinator is sufficiently advanced and properly regulated to cause melting of tin at the desired rate and feeding of the same into the bath of liquid tin tetrachloride, the valve 25' in the chlorine inlet 25 is opened, and chlorine is charged into the pool through the perforated pipe 24. The tin in the pool, being in a finely divided condition, reacts readily with the chlorine, and the bulk of the product of the reaction is rapidly formed in liquid condition. The quantity of chlorine admitted to the chlorinator through inlet pipe 25 is preferably not substantially more than that required to react with the shot tin in the pool.

The reaction of shot tin and chlorine is, of course, exothermic, and the temperature of the bath of liquid tin tetrachloride tends to rise. According to the preferred procedure, sufficient cooling liquid is circulated through the coil 26 to maintain the temperature of the bath preferably between 150° and 200° F., to prevent excessive pressures due to vaporization of tin tetrachloride, and also to avoid corrosion of the apparatus. The product of the process comprising the liquid tin tetrachloride formed in the lower zone 18 by the reaction of chlorine and shot tin and the tin tetrachloride forming in the upper zone 19 and condensing on the water cooled walls of the shell is substantially continuously withdrawn from the pool of liquid tin tetrachloride through the outlet pipe 22.

In the normal operation of the embodiment of the process carried out in the apparatus of Fig. 1, temperature conditions in the upper zone 19 are preferably so regulated that about 10% of the product of the process is formed by the combination of chlorine and block tin, the larger portion of the reaction taking place in the lower zone between the chlorine and shot tin. Such procedure is preferred, since economic operating results may be obtained by utilizing the upper reaction zone principally as a source of supply of finely divided tin for the primary reaction zone in the liquid bath.

When carrying out the process in the apparatus of Fig. 2, the general method of operation is substantially the same as in Fig. 1, the only material difference being in the manner of securing the desired temperature control in the upper reaction zone 49. When the process is under way, a mixture of inert gases and tin tetrachloride vapor passes into the reflux condenser 60 through the pipe connection 61. The cooling effect of the condenser is so regulated as to bring about condensation of substantially all of the tin tetrachloride in the gas mixture, the liquid dropping back into the reaction zone 49, and eventually running through the grille 17 into the pool in the lower reaction zone 48. It will be seen that alternate condensation and vaporization of tin tetrachloride removes excess heat from the reaction zone 49 and tends to keep the temperature within operative limits.

Gases uncondensed in the reflux condenser are withdrawn therefrom by the exhauster 62, and are fed back into the chlorinator at a point just beneath the grille 17. During passage through the piping the gases are further cooled, and when introduced into the reaction chamber are at temperatures considerably less than the boiling point of tin tetrachloride. Additional means may be included in pipe connection 63—64 for cooling the gas stream if desired. In the zone immediately beneath the grille 17, the cooled inert gases mingle with whatever quantity of chlorine is being introduced through pipe 65, and the mixture passes upwardly through the grille and into contact with the block tin. This recirculation of gases combined with the action of the reflux condenser and the introduction of limited quantities of chlorine through the inlet pipe 66 provides adequate temperature control for the upper reaction zone 49.

From an inspection of Fig. 2, it will be seen that the lower end of the chlorinator containing the pool of liquid tin tetrachloride is considerably enlarged, and presents an extensive area to the cooling influence of the atmosphere. Accordingly, radiation of the heat aided by the cooling effect of the reflux condenser is sufficient to keep the temperature of the bath well below the boiling point of tin tetrachloride. If desired, of course, a cooling coil may also be employed as in the apparatus of Fig. 1. In respects other than already described, the operation of the process as carried out in the chlorinator of Fig. 2 is substantially the same as in Fig. 1.

Referring to Fig. 3, the mixture of inert gases and tin tetrachloride vapor formed in the upper reaction zone 19 is withdrawn and conducted through pipe 70 into the condenser 71. The flow of cooling liquid through the condenser is so regulated as to reduce the temperature of the chlorinator gases and vapors to about 150° F. The larger portion of tin tetrachloride is thus condensed out of the gas stream, and runs out of the apparatus, as liquid, through the seal 74. The uncondensed gases, comprising say 85% air and 15% tin tetrachloride vapor, are withdrawn from the condenser by the exhauster 76, and are charged back into the reaction chamber through the pipe 77 opening into the chlorinator beneath the chlorine inlet pipe 78 and the grille 17. Accordingly, it will be seen that the temperature of the gas mixture rising through grille 17 is not substantially in excess of about 150° F., and that temperature control in the upper reaction zone 19 is readily obtained.

In all of the above described modifications of the process, a quantity of liquid tin tetrachloride may be withdrawn from the pool, and pumped through a suitable pipe connection and spray heads, if desired, into the upper end of the chlorinator. This procedure provides a further means by which the temperature in the upper reaction zone may be maintained within the desired limits.

In connection with Fig. 3, it is to be noted that by controlling the volume and concentration of chlorine in the gases circulated through the apparatus by blower 76, the operation of the process may be conducted in such manner as to substantially prevent melting of tin on the grille 17. When, for example, the amount of chlorine admitted through pipe 78 is restricted sufficiently to prevent undue temperature rise, melting of the block tin may be substantially prevented, and the entire product of the process initially formed in the vapor state in the chlorinator and withdrawn from the system as liquid through the outlet 74. In this instance, it will be understood, the base of the chlorinator is immediately below the inlet pipe 77, and the pool of liquid tin tetrachloride is not employed.

I claim:

1. The method of combining a solid material and a gas which react exothermically to form a product existing in liquid condition at normal temperature which comprises melting the solid material by the heat of reaction of the solid and the gas, introducing the melted material into a bath of liquid product, and reacting the material so introduced into the bath with gas to combine the gas and material.

2. The method of combining a solid material and a gas which react exothermically to form a product existing in liquid condition which comprises melting the solid material by the heat of reaction of the solid and the gas, introducing the melted material into a bath of liquid product maintained at a temperature less than the melting point of the material, whereby the material solidifies in finely divided condition, and reacting the solid material in the bath with gas to combine the gas and solid.

3. The method of combining a solid material and a gas which react exothermically to form a product existing in liquid condition at normal temperature which comprises reacting said solid material with said gas, controlling the temperature of the reaction so as to effect melting of portions of said solid material by heat of reaction, introducing the melted material into a bath of liquid product, reacting the material so introduced into the bath with gas to combine the gas and material, withdrawing liquid product from said bath and contacting liquid product with said solid material to aid in controlling the temperature of reaction of said solid material and gas.

4. The process of making tin tetrachloride which comprises melting tin, introducing the molten tin into a reaction zone, and reacting the tin in the reaction zone with chlorine in the presence of liquid tin tetrachloride.

5. The process of making tin tetrachloride which comprises melting tin, introducing the molten tin into a bath of liquid tin tetrachloride, and reacting the tin thus introduced into the bath with chlorine to form tin tetrachloride.

6. The process of making tin tetrachloride which comprises melting tin by the heat of reaction of tin and chlorine, introducing the molten tin into a bath of liquid tin tetrachloride, and reacting the tin thus introduced into the bath with chlorine to form tin tetrachloride.

7. The process of making tin tetrachloride which comprises reacting tin with chlorine, controlling the temperature of the reaction so as to effect melting of portions of the tin by the heat of reaction, introducing the molten tin into a bath of liquid tin tetrachloride, and reacting the tin so introduced into the bath with chlorine to form tin tetrachloride.

8. The process of making tin tetrachloride which comprises reacting tin with chlorine, controlling the temperature of the reaction by regulating the quantity of chlorine admitted thereto so as to effect gradual melting of portions of the tin by the heat of reaction, introducing the molten tin into a bath of liquid tin tetrachloride, and reacting the tin so introduced into the bath with chlorine to form tin tetrachloride.

9. The method of making tin tetrachloride in a multi-stage operation carried out in communicating reaction zones which comprises charging solid tin into one reaction zone, reacting the tin therein with chlorine to form tin tetrachloride and melt tin by the heat of reaction, introducing the molten tin into a second reaction zone, and reacting the tin in the second reaction zone with chlorine to form tin tetrachloride.

10. The method of making tin tetrachloride in a multi-stage operation carried out in communicating reaction zones which comprises charging solid tin into one reaction zone, reacting the tin therein with chlorine to form tin tetrachloride and melt tin by the heat of reaction, maintaining a bath of liquid tin tetrachloride in a second reaction zone, introducing molten tin from the first reaction zone into the bath of liquid tin tetrachloride, and reacting the tin in the bath with chlorine to form tin tetrachloride.

11. The method of making tin tetrachloride in multi-stage operation carried out in communicating reaction zones which comprises charging solid tin into one reaction zone, introducing chlorine into the zone to react with tin, controlling the amount of chlorine admitted to the reaction zone so as to maintain the temperature therein not substantially in excess of the melting point of tin whereby a limited amount of tin tetrachloride is formed and tin is melted, maintaining a bath of liquid tin tetrachloride in a second reaction zone, feeding the molten tin into the bath, and introducing into the bath not substantially more than sufficient chlorine to react with the tin therein to form tin tetrachloride.

12. The method of making tin tetrachloride in multi-stage operation carried out in communicating reaction zones which comprises charging solid tin into one reaction zone, introducing chlorine into the zone to react with tin, controlling the amount of chlorine admitted to the reaction zone so as to maintain the temperature therein not substantially in excess of the melting point of tin whereby a limited amount of tin tetrachloride is formed and tin is melted, maintaining a bath of liquid tin tetrachloride in a second reaction zone, condensing the tin tetrachloride formed in the first reaction zone, feeding the condensed tin tetrachloride into the bath, feeding molten tin into the bath whereby the tin solidifies and assumes a finely divided condition, and introducing into the bath not substantially more than sufficient chlorine to react with the tin therein to form tin tetrachloride, and withdrawing tin tetrachloride from the bath.

13. The method of making tin tetrachloride which comprises reacting tin in a reaction zone with chlorine in amounts such as to form tin tetrachloride in the vapor state and generate sufficient heat to melt tin, withdrawing gases containing tin tetrachloride vapor from the reaction zone, and maintaining the temperature in the reaction zone not substantially above the melting point of tin by passing inert gases therethrough.

14. The method of making tin tetrachloride which comprises reacting tin in a reaction zone with chlorine in amounts such as to form tin tetrachloride in the vapor state and generate sufficient heat to melt the tin, withdrawing gases containing tin tetrachloride vapor from the reaction zone, cooling the gases to condense and remove tin tetrachloride therefrom, returning the cooled residual gases admixed with further quantities of chlorine to the reaction zone whereby the temperature therein is maintained not substantially in excess of the melting point of tin, introducing the molten tin from the first reaction zone into a second reaction zone, and reacting the tin therein with chlorine to form tin tetrachloride.

15. The process of making tin tetrachloride which comprises reacting solid tin with chlorine, controlling the temperature of the reaction so as to effect melting of portions of the tin by heat of reaction, introducing molten tin into a bath of liquid tin tetrachloride, reacting tin so introduced into the bath with chlorine to form tin tetrachloride, withdrawing liquid tin tetrachloride from the bath, and contacting liquid tin tetrachloride with said solid tin to aid in controlling the temperature of reaction of solid tin and chlorine.

PAUL L. TYSON.